(12) United States Patent
Pan et al.

(10) Patent No.: US 11,210,766 B2
(45) Date of Patent: Dec. 28, 2021

(54) METHOD OF JITTER DETECTION AND IMAGE RESTORATION FOR HIGH-RESOLUTION TDI CCD SATELLITE IMAGES

(71) Applicant: Wuhan University, Wuhan (CN)

(72) Inventors: Jun Pan, Wuhan (CN); Guo Ye, Wuhan (CN); Mi Wang, Wuhan (CN); Ying Zhu, Wuhan (CN)

(73) Assignee: WUHAN UNIVERSITY, Wuhan (CN)

( * ) Notice: Subject to any disclaimer, the term of this patent is extended or adjusted under 35 U.S.C. 154(b) by 0 days.

(21) Appl. No.: 17/024,678

(22) Filed: Sep. 17, 2020

(65) Prior Publication Data

US 2021/0104022 A1 Apr. 8, 2021

(30) Foreign Application Priority Data

Oct. 8, 2019 (CN) .......................... 201910950405.4

(51) Int. Cl.
*G06T 5/00* (2006.01)
*G06T 5/20* (2006.01)

(52) U.S. Cl.
CPC ................ *G06T 5/002* (2013.01); *G06T 5/20* (2013.01); *G06T 2207/10032* (2013.01); *G06T 2207/20004* (2013.01)

(58) Field of Classification Search
None
See application file for complete search history.

(56) References Cited

U.S. PATENT DOCUMENTS

2005/0069207 A1* 3/2005 Zakrzewski ....... B64D 45/0053
382/190
2017/0170854 A1* 6/2017 Soualle .................... H04B 1/16
(Continued)

FOREIGN PATENT DOCUMENTS

CN 104536293 B * 2/2017

OTHER PUBLICATIONS

Tong, Xiaohua, et al. "Framework of jitter detection and compensation for high resolution satellites." Remote Sensing 6.5 (2014): 3944-3964. (Year: 2014).*

(Continued)

*Primary Examiner* — Andrae S Allison
(74) *Attorney, Agent, or Firm* — Matthias Scholl P.C.; Matthias Scholl (57) ABSTRACT

A method of jitter detection and image restoration for high-resolution TDI CCD satellite images. The method includes: obtaining a parallax image after a sub-pixel matching method relying on a correlation coefficient and least squares algorithm; transferring a jitter offset from an image space to an object space by an integral transformation function (ITF); dealing with a continuous push-broom mode of cameras in a discrete way with a denser sampling strategy according to a continue dynamic shooting model (CDSM), obtaining a specialized CDSM and feeding it back to the ITF; applying the accurate ITF to the obtained parallax image and conducting the jitter curve fitting to achieve the jitter detection; estimating a correspondent partial PSF according to the CDSM and the obtained jitter curve; carrying out an adaptive restoration based on context through optimal window Wiener filtering, by means of multiple input and single output to completes the image restoration.

11 Claims, 8 Drawing Sheets

(56) References Cited

U.S. PATENT DOCUMENTS

2019/0101653 A1* 4/2019 Soga ................... G01C 21/28
2020/0084736 A1* 3/2020 Regunathan ....... H04B 7/18523

OTHER PUBLICATIONS

J. Pan et al., "Jitter Detection and Image Restoration Based on Continue Dynamic Shooting Model for High-Resolution TDI CCD Satellite Images," in IEEE Transactions on Geoscience and Remote Sensing, vol. 59, No. 6, pp. 4915-4933, Jun. 2021, doi: 10.1109/TGRS.2020.3011955. (Year: 2021).*

Liu, Haiqiu, et al. "Jitter detection based on parallax observations and attitude data for Chinese Heavenly Palace-1 satellite." Optics express 27.2 (2019): 1099-1123. (Year: 2019).*

Pan, Jun, et al. "Satellite jitter estimation and validation using parallax images." Sensors 17.1 (2017): 83. (Year: 2017).*

* cited by examiner

METHOD OF JITTER DETECTION AND IMAGE RESTORATION FOR HIGH-RESOLUTION TDI CCD SATELLITE IMAGES

CROSS-REFERENCE TO RELATED APPLICATIONS

Pursuant to 35 U.S.C. § 119 and the Paris Convention Treaty, this application claims foreign priority to Chinese Patent Application No. 201910950405.4 filed Oct. 8, 2019, the contents of which, including any intervening amendments thereto, are incorporated herein by reference. Inquiries from the public to applicants or assignees concerning this document or the related applications should be directed to: Matthias Scholl P. C., Attn.: Dr. Matthias Scholl Esq., 245 First Street, 18th Floor, Cambridge, Mass.

BACKGROUND

The disclosure relates to the field of remote sensing image processing and analysis, and more particularly to a method of jitter detection and image restoration for high-resolution Time delay Integration Charge-Coupled device (TDI CCD) satellite images based on continue dynamic shooting model.

The TDI CCD is one of the common sensors in high-resolution spaceborne optical imaging system. It can increase the luminous flux so as to improve the sensitivity and signal-to-noise ratio of a camera, while the use of integral imaging techniques makes it more vulnerable to satellite jitter. Satellite jitter will lead to a decline in image quality, comprising distortion and blur, which limits the application of high-precision remote sensing images.

For jitter detection, the discretization processing for the push-broom imaging process of satellites is essential. Large calculation errors will occur in the traditional methods along with the large sampling interval. Besides, the overall image offset of ground objects in image space is always on the focus, but the transient change of satellite jitter in object space does not get attention. The jitter detection accuracy is difficult to meet the high requirements because of the weak imaging analysis. As for image restoration, the traditional manner, which applies the same point spread function (PSF) to the entire image, becomes inapplicable to the high-frequency satellite jitter due to the appearance of complex temporal jitter changes.

SUMMARY

The disclosure provides a method of jitter detection and image restoration for high-resolution TDI CCD satellite images based on a continue dynamic shooting model. The conversion of satellite jitter from the image space to the object space, as well as the decomposition of the overall effect in immediate effects is achieved through the integral transformation function (ITF). Meanwhile, continue dynamic shooting model (CDSM), a more intensive sampling strategy in discretization calculation, reflects the continuous push-broom mode of the TDI CCD. In addition, an adaptive image restoration based on context, which combines time, space, and spectrum information, makes the coupling effects, i.e. distortion and blur, reduced simultaneously.

The disclosure provides a method of jitter detection and image restoration for high-resolution TDI CCD satellite images based on continue dynamic shooting model.

The method comprises:
1) obtaining a parallax image after a sub-pixel matching method relying on a correlation coefficient and least squares algorithm;
2) transferring a jitter offset from an image space to an object space by an integral transformation function (ITF), which establishes a relationship between the parallax image and a jitter curve;
3) dealing with a continuous push-broom mode of cameras in a discrete way with a denser sampling strategy according to a continue dynamic shooting model (CDSM), obtaining a specialized CDSM after determining a number of subdivisions in the CDSM through a sampling error formula established according to the ITF, and feeding the specialized CDSM back to the ITF, so that an accurate ITF is obtained;
4) applying the accurate ITF to the obtained parallax image and conducting the jitter curve fitting to achieve the jitter detection;
5) estimating a correspondent partial PSF, combining spectral and temporal dimensions, according to the CDSM and the obtained jitter curve; and
6) carrying out an adaptive restoration based on context using the partial PSF through optimal window Wiener filtering, by means of multiple input and single output to completes the image restoration.

Two stages in the method, comprising jitter detection and image restoration, are both based on CDSM, which reflects the real push-broom mode of the satellite by a denser sampling strategy. Due to the CDSM, the jitter curve has a more detailed description, and then when it is performed to partial PSF estimation, CDSM makes the sampling error reduced.

Compared with the existing technology, the disclosure has the following beneficial effects: the relationship between jitter offsets in image space and object space is established, so that the overall image motion is decomposed into the time-varying offsets. The real push-broom mode of the satellite is reflected by a denser sampling strategy for TDI CCD imaging process, which overcomes the shortcomings of traditional methods in discretization of TDI CCD exposure time so as to increase the jitter detection accuracy. Dropping the entire PSF in the traditional manner, the space-variant partial PSF is adopted in the adaptive image restoration based on context, making time, space, and spectrum information combined, hence, the coupled distortion and blur effects are reduced simultaneously.

DETAILED DESCRIPTION

To further illustrate the disclosure, embodiments detailing a method of jitter detection and image restoration for high-resolution TDI CCD satellite images based on a continue dynamic shooting model are described below. It should be noted that the following embodiments are intended to describe and not to limit the disclosure.

Figure 1:
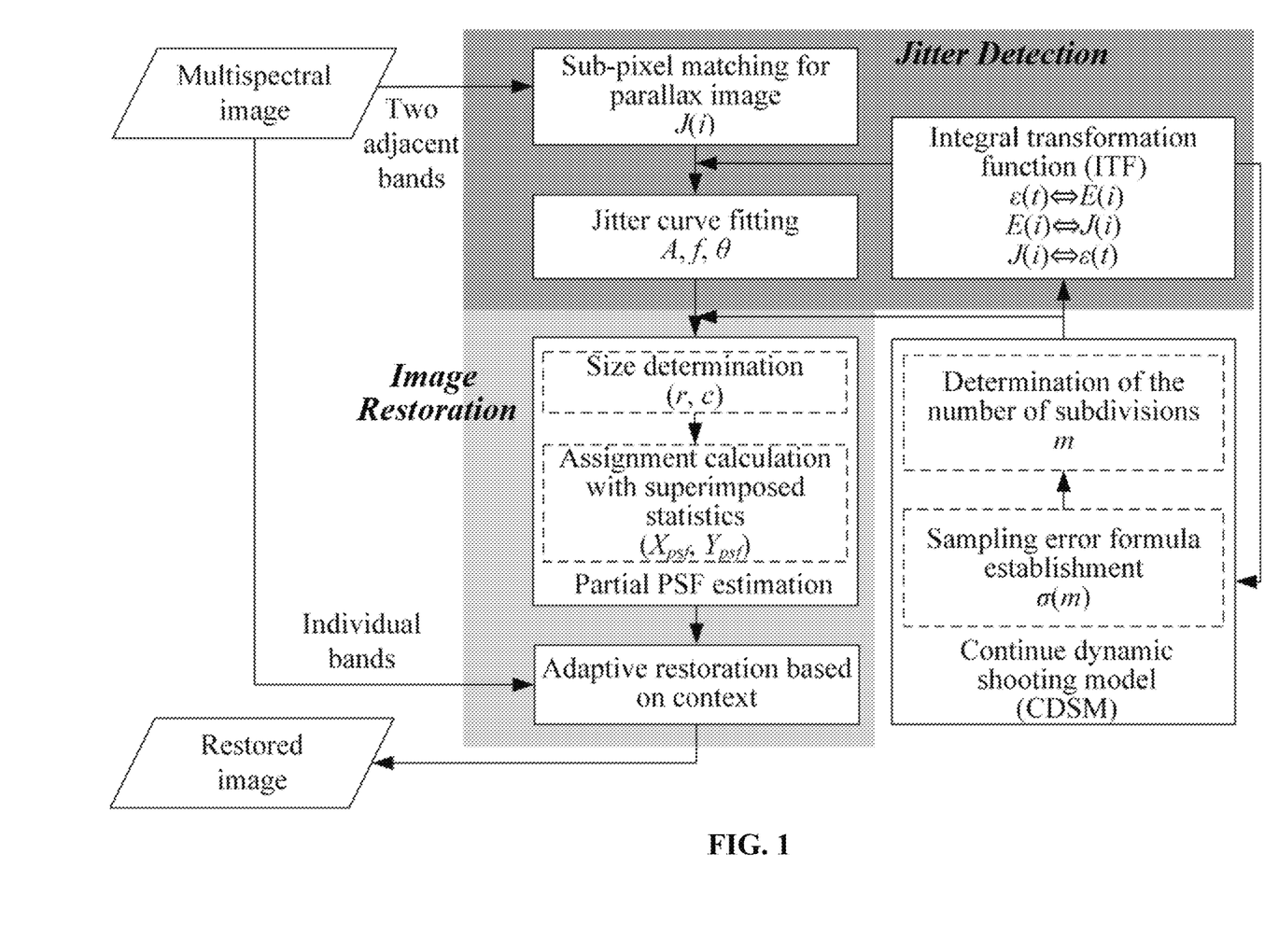
FIG. 1 is a flowchart of the method of jitter detection and image restoration for high-resolution TDI CCD satellite images based on continue dynamic shooting model.

FIG. 1 is a flowchart that illustrates the method of jitter detection and image restoration for high-resolution TDI CCD satellite images in the disclosure.

Step 1: Obtain the parallax image after the sub-pixel matching method relying on correlation coefficient and least squares algorithm.

According to the construction of TDI CCD, each band is arranged in parallel on the focal plane with fixed distance. If L is the distance between two adjacent bands, the correlation coefficients between matched point pairs with L-lines apart on these two bands respectively are calculated, and then the candidate with the maximum correlation is picked as the coarse corresponding point. Next, with the coarse corresponding point as the center of the matching window, the transformation parameters are obtained by the iterative least squares solution, so as to attain the refined corresponding point. In the iterative process of the least square matching, certain threshold of correlation coefficient and maximum of iteration times are used to filter out the mismatching points. In this way, the correlation matching provides the whole-pixel corresponding point while the least square matching further achieves a sub-pixel accuracy, and the parallax image (J(i), where i stands for the line number of the image) is obtained.

Step 2: Transfer the jitter offset from image space to object space by the integral transformation function (ITF), which establishes the relationship between parallax image and jitter curve.

This step further comprises the following sub-steps:

Step 2.1: Establish the expression of satellite jitter in image space. The same imaging process exists in each line of the image and the same effect caused by jitter is employed on each pixel in the line, thus, the imaging line is regarded as the target. Due to the unique integration imaging features of TDI CCD, there is not only the charge generation through the photoelectric conversion at each exposure moment, but also the charge bag transferring and accumulating. Being in part the integration imaging results, the jitter expressed in the image is in fact an accumulation of time-varying offsets described by the jitter curve in object space. The integration stages of TDI CCD is usually taken as the exposure times in the single-row imaging process, and the addition of multiple jitter offsets is performed at each exposure moment. T is the time for once integration, $\varepsilon(t)$ is the jitter curve which records the time-varying jitter offsets in object space, N represents the integration stages of TDI CCD. The imaging time of each row is divided into N equal parts, and endpoints of each interval correspond to the exposure moments. Take the row i for instance, after k+1 (k=1, 2, ..., N−1) times accumulation of jitter offsets by TDI CCD, the output is the overall motion of the pixels at that line on the image, i.e. the expression of satellite jitter in image space, recorded by E(i), and it can be expressed as follows:

$$E(i) = \frac{1}{N}\left[\frac{1}{2}\varepsilon((i-N)T) + \sum_{k=1}^{N-1}\varepsilon((i-N+k)T) + \frac{1}{2}\varepsilon(iT)\right]. \quad (1)$$

Step 2.2: Establish the relationship between parallax image and the expression of satellite jitter in image space. The parallax image obtained in step 1 is generated by calculating the coordinate difference between corresponding points in two adjacent bands. Due to the fixed distance L between the two bands, the imaging time interval between the corresponding row in two bands is L times as long as the imaging time of the row. Hence, the relationship between parallax image (J(i)) and the expression of satellite jitter in image space (E(i)) can be expressed as:

$$J(i)=E(i+L)-E(i) \quad (2).$$

Step 2.3: Substituting Eq. (1), which records the relationship between jitter curve and image motion within the step 2.1, into Eq. (2), which shows the relationship between parallax image and image motion within the step 2.2. Thus, the ITF is defined as follows:

$$J(i) = \frac{1}{N}\left\{\frac{1}{2}[\varepsilon((i+L-N)T) + \varepsilon((i+L)T) - \varepsilon((i-N)T) - \varepsilon((i)T)] + \sum_{k=1}^{N-1}[\varepsilon((i+L-N+k)T) - \varepsilon((i-N+k)T)]\right\}. \quad (3)$$

Figure 2:
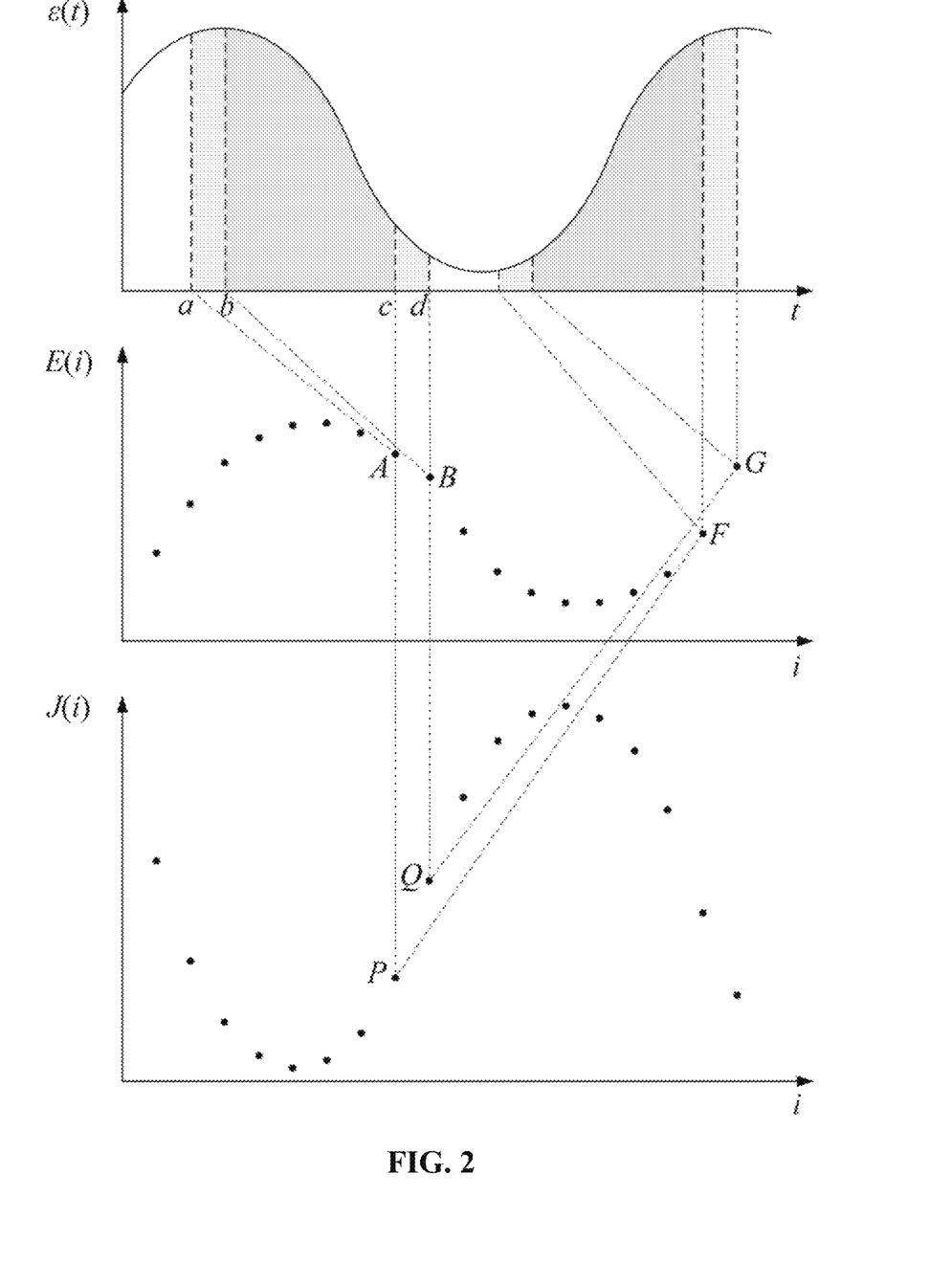
FIG. 2 is a schematic diagram of the evolving process as described by the ITF.

FIG. 2 is a schematic diagram of the $\varepsilon(t)$-to-J(i) evolving process as described by the ITF. Point A in the image motion E(i) can be obtained from the integration of the offsets comprised in the interval (a,c) below the jitter curve $\varepsilon(t)$, while point B on the next row can be obtained from the integration of the offsets comprised in the interval (b,d). In the case described above, (a,c) and (b,d) correspond to the single-row imaging time; additionally, (a,b) corresponds to the single integration time of the TDI CCD. Points F and G in E(i) can be obtained in the same way as points A and B. Point P in the parallax image J(i), can be calculated from the image motion differences between corresponding rows on adjacent bands (it corresponds to points A and F in E(i)). Similarly, point Q on the next row can be obtained by points B and G in the same way as point P. Thus, the ITF formulates the $\varepsilon(t)$-to-J(i) transition with E(i) as an intermediary, and the relationship between the parallax image J(i) and the jitter curve $\varepsilon(t)$ is established.

Through the ITF, the offsets caused by satellite jitter is decomposed from the overall image motion to the time-varying change along with the imaging process. Therefore, the jitter offset at each discrete moment corresponding to the exposure of TDI CCD is extracted in a quantitative way, so that the calculated output jitter offset is more accurate, which is benefit for improving the accuracy of jitter detection.

Step 3: Deal with the continuous push-broom mode of cameras in the discrete way with a denser sampling strategy according to the continue dynamic shooting model (CDSM), obtain the specialized CDSM after determining the number of subdivisions in the CDSM through the sampling error formula established according to the ITF, and feed the CDSM specialized by the ITF back to the ITF, so that the accurate ITF is obtained.

This step further comprises the following sub-steps:

Step 3.1: Deal with the continuous push-broom mode of cameras in the discrete way with a denser sampling strategy according to the continue dynamic shooting model (CDSM). The jitter curve $\varepsilon(t)$ is usually expressed by the sine function.

$$\varepsilon(t) = A\sin\left(\frac{2\pi}{T_j}t + \theta\right); \quad (4)$$

where A is the amplitude, $T_j$ is the period of the jitter curve, t is the time and θ is the initial phase. Since Eq. (1) within the step 2.1 illustrates the image motion caused by satellite jitter E(i), the concrete expression of E(i) can be obtained by substituting Eq. (4) into Eq. (1).

$$E(i) = \frac{1}{N}\left[\frac{1}{2}A\sin\left((i-N)\frac{2\pi T}{T_j}+\theta\right)+ \sum_{k=1}^{N-1} A\sin\left((i-N+k)\frac{2\pi T}{T_j}+\theta\right)+\frac{1}{2}A\,\sin\left(i\cdot\frac{2\pi T}{T_j}+\theta\right)\right]. \quad (5)$$

The imaging time of a single row is divided into N intervals in the common manners, where N is the integration stages of TDI CCD. As the jitter is sustained during the continues push-broom of the satellite, some important points with rapid changes on the jitter curve may be ignored through such traditional discretization approach. The continue dynamic shooting model (CDSM) provides a denser sampling strategy to reflect the continuous push-broom mode of cameras in the discrete way, so as to involve the continues jitter into the calculation as much as possible and reduce the error because of discretization.

Figure 3A:
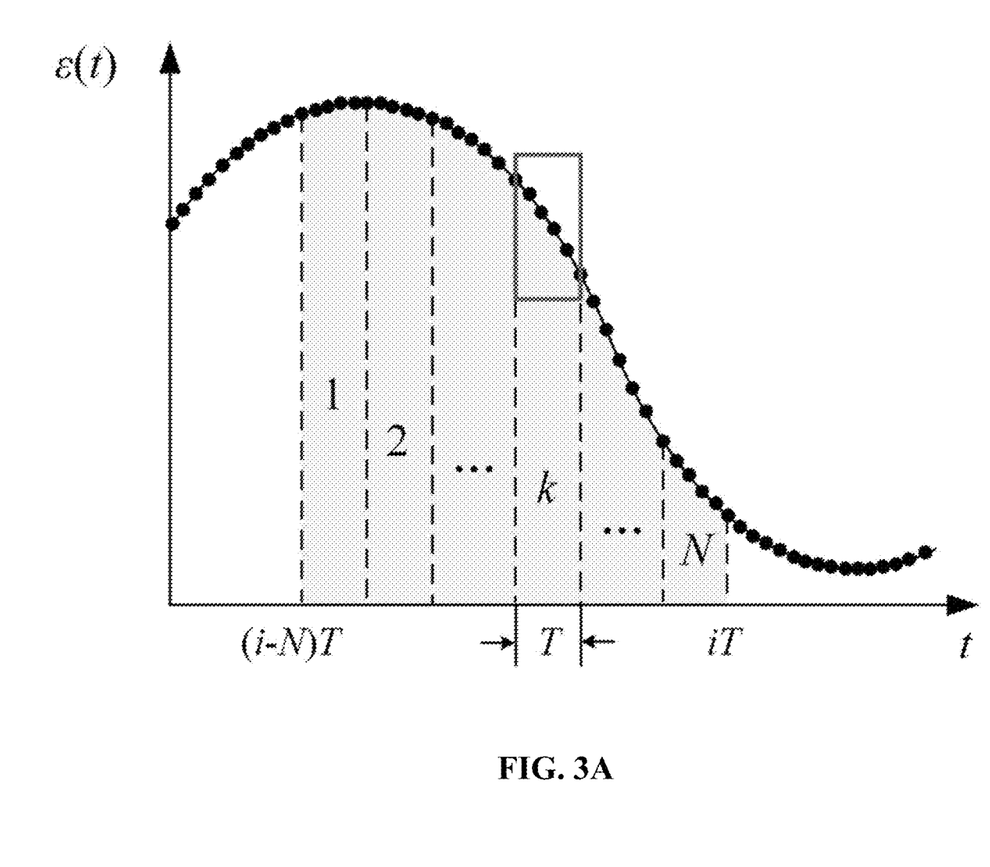
FIGS. 3A-3B show sampling points in the CDSM.
Figure 3B:
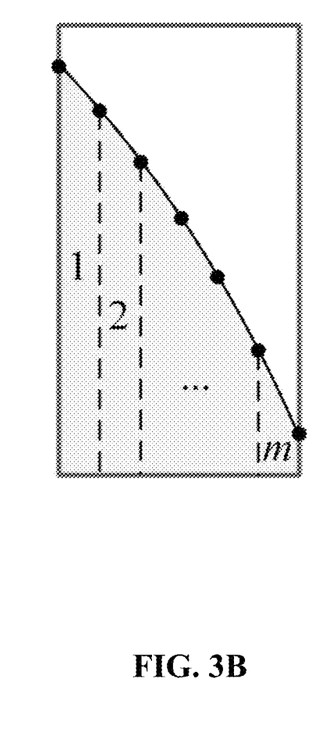

FIGS. 3A-3B show the sampling points in the CDSM. Taken the row i for example, the single-row imaging time has been divided into N equal parts and the sampling points following the traditional manner correspond to the endpoints of each of these parts. The CDSM makes subdivision performed on the divided intervals that exist. FIGS. 3A-3B take interval k for instance and the interval is marked with orange box. It shows that the CDSM would further subdivide each interval into m equal parts and select sampling points at the end of these parts. By applying the CDSM, the single-row imaging time would be segmented into a total of N*m parts, obtaining a total of (N*m+1) sampling points, where the accumulation of jitter offsets is conducted. If the CDSM with such denser sampling strategy is used, Eq. (5) can be written by:

$$E(i,m) = \frac{1}{mN}\left[\frac{1}{2}A\sin\left((i-N)\frac{2\pi T}{T}+\theta\right)+ \sum_{k=1}^{mN-1} A\sin\left(\left(i-N+\frac{k}{m}\right)\frac{2\pi T}{T}+\theta\right)+\frac{1}{2}A\sin\left(i\cdot\frac{2\pi T}{T_j}+\theta\right)\right]. \quad (6)$$

The discretization pattern in the CDSM makes the sampling interval more intensive. Time-varying offsets in the jitter curve will be taken into account as much as possible with lots of subdivisions in CDSM, therefore, the discrete operation approximates the real-time continues in-orbit situation, which allows the CDSM to reflect the continuous push-broom mode of cameras.

Step 3.2: Obtain the specialized CDSM after determining the number of subdivisions in the CDSM through the sampling error formula established according to the ITF. The discrete processing of the TDI CCD photoelectric transfer results in an inevitable error between the results of the theoretical calculation and the real continuous case. The extent to which the CDSM can reduce this error depends on the number of subdivisions (i.e., m). The sampling error formula is established according to the ITF to explore the relationship between m and the corresponding error.

The imaging time of a row is denoted by $T_r$, and then $T_r=NT$, where N represents the number of integration stages of the TDI CCD, and T is the single integration time of the TDI CCD. The imaging process is the same for each line of the image. To simply the analysis, the row, whose imaging time is comprised in the interval $(0,T_r)$, is adopted for an example. The image motion caused by jitter of that row is noted as S(m), and it can be expressed by the following equation according to Eq. (6) within the step 3.1.

$$S(m) = \qquad (7)$$
$$\frac{1}{mN}\left[\frac{1}{2}A\sin\theta + \sum_{k=1}^{mN-1} A\sin\left(\frac{2\pi}{T_j}\cdot\frac{kT_r}{mN}+\theta\right)+\frac{1}{2}A\sin\left(\frac{2\pi}{T_j}\cdot T_r+\theta\right)\right] =$$
$$\frac{1}{mN}\left[\frac{1}{2}A\sin\theta + A\frac{\cos\left(\frac{\pi}{mN}\cdot\frac{T_r}{T_j}+\theta\right)-\cos\left(\left(2-\frac{1}{mN}\right)\cdot\frac{\pi T_r}{T_j}+\theta\right)}{2\sin\left(\frac{\pi}{mN}\cdot\frac{T_r}{T_j}\right)}+\right.$$
$$\left.\frac{1}{2}A\sin\left(\frac{2\pi}{T_j}\cdot T_r+\theta\right)\right].$$

The true value of the image motion (C) following a continuous camera push-broom is:

$$C = \frac{1}{T_r}\int_0^{T_r} A\sin\left(\frac{2\pi}{T_j}t+\theta\right)dt = \frac{A}{2\pi}\cdot\frac{T_j}{T_r}\left[\cos\theta - \cos\left(2\pi\cdot\frac{T_r}{T_j}+\theta\right)\right]. \quad (8)$$

The relative error between the true value (C) and the calculated value (S(m)) can reflect the error caused by the sampling density due to the number of subdivisions in the CDSM (m). Therefore, the sampling error formula is established as follows:

$$\sigma(m) = \left|\frac{S(m)-C}{c}\right| = \left|\frac{\pi}{mN}\cdot\frac{T_r}{T_j}\cot\left(\frac{\pi_r}{mN}\cdot\frac{T}{T_j}\right)-1\right|. \quad (9)$$

It indicates that the sampling error (σ(m)) is directly related to m and affected by the ratio between $T_r$ and $T_j$, as well as by the number of integration stages (N). For a certain jitter, the deviation of the fitted curve is positively related to the imaging time, thus, the error tends to increase with $$\frac{T_r}{T_j}.$$

Figure 4A:
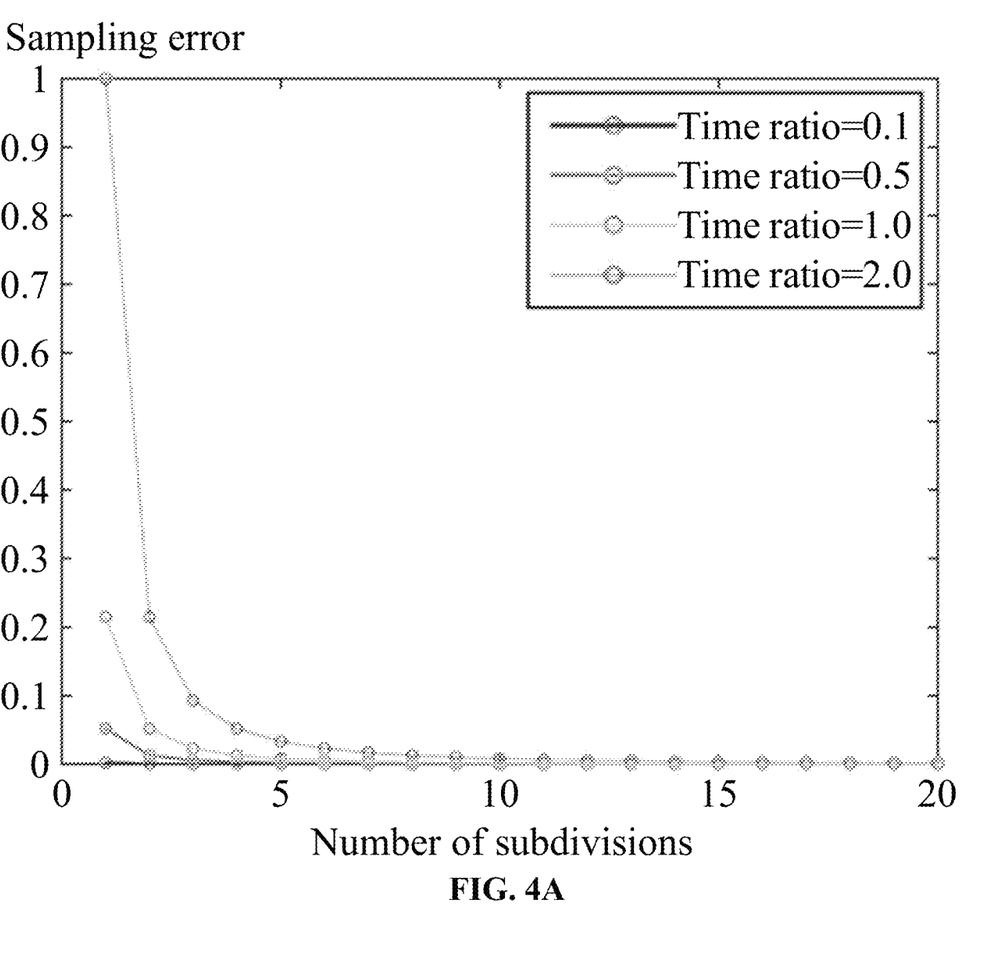
FIGS. 4A-4B show the relationship between the sampling error and the number of subdivisions in CDSM, with different values of the time ratio and different number of integration stages set on TDI CCD respectively.
Figure 4B:
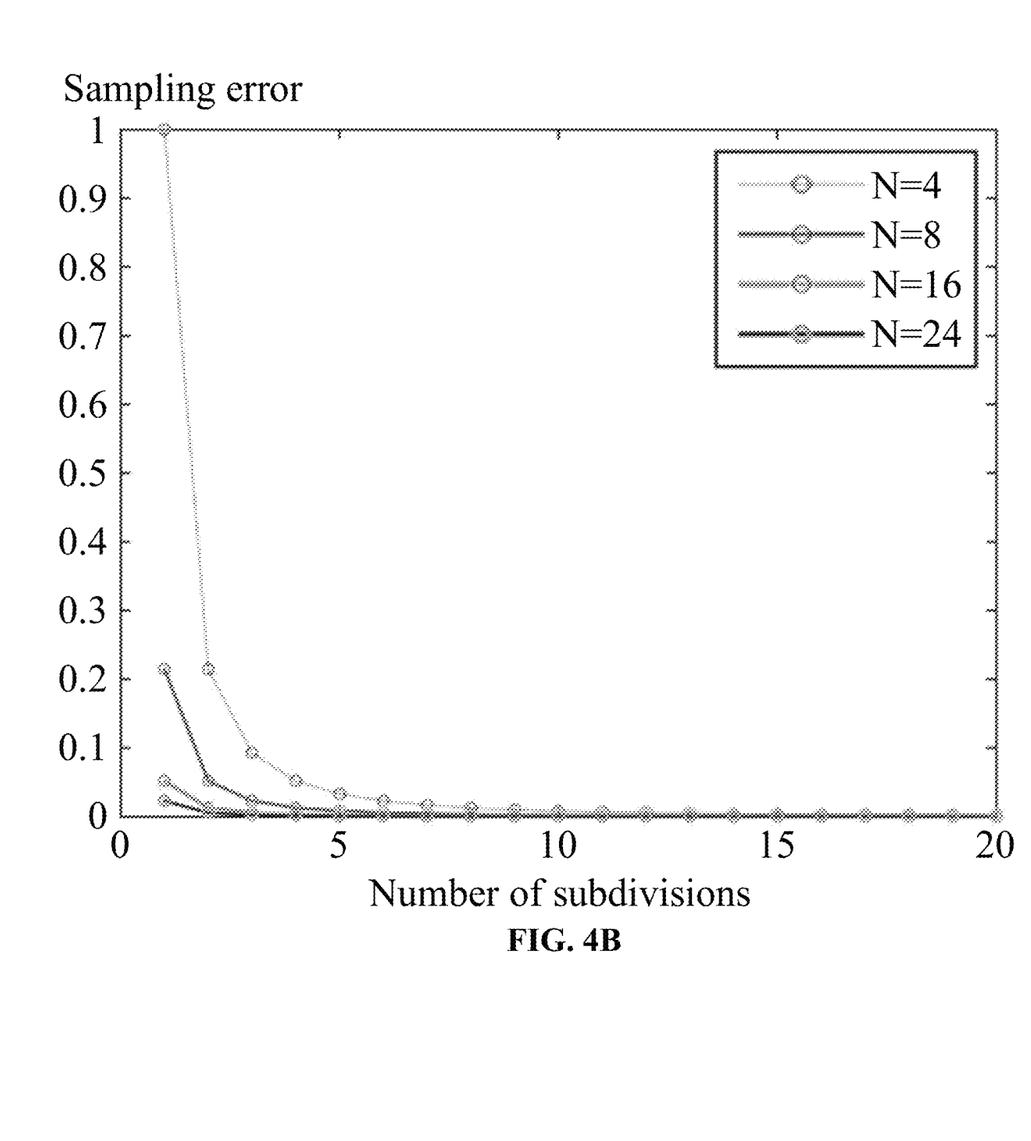

FIG. 4A is a schematic diagram showing the relationship between the sampling error (σ(m)) and the number of subdivisions (m) in CDSM, with different values of the time ratio $$\left(\frac{T_r}{T_j}\right),$$

in the case of N=4. The number of integration stages (N), is an inherent attribute of the TDI CCD and varies for each camera. FIG. 4B is a schematic diagram showing the relationship between the sampling error (σ(m)) and the number of subdivisions (m), with different values of the number of integration stages (N) where the time ratio is set at 2. Adopting a TDI CCD with a higher N has the same effect of increasing the m value in the CDSM: the sampling density increases and the error is reduced Nevertheless, independently from $$\frac{T_r}{T_j}$$

and N, larger m values in the CDSM will correspond to smaller errors. Besides, these errors tend to remain stable despite continuous increases in m. The error remains relatively stable for m≥6, therefore, 6 is taken as a reasonable number of subdivisions.

Step 3.3: Feed the CDSM specialized by the ITF back to the ITF, so that the accurate ITF is obtained.

After the number of subdivisions (m) in the CDSM is determined, the specialized CDSM described by Eq. (6) is feed back to the ITF illustrated by Eq. (2), and then the accurate ITF is obtained as follows.

$$J(i) = \frac{A}{mN}\left\{\frac{1}{2}\left[\sin\left((i+L-N)\frac{2\pi T}{T_j}+\theta\right)+\sin\left((i+L)\frac{2\pi T}{T_j}+\theta\right)\right] - \frac{1}{2}\left[\sin\left((i-N)\frac{2\pi T}{T_j}+\theta\right)-\sin\left(i\cdot\frac{2\pi T}{T_j}+\theta\right)\right] + \sum_{k=1}^{mN-1}\left[\sin\left(\left(i+L-N+\frac{k}{m}\right)\frac{2\pi T}{T_j}+\theta\right) - \sin\left(\left(i-N+\frac{k}{m}\right)\frac{2\pi T}{T_j}+\theta\right)\right]\right\}. \quad (10)$$

As thus, the ITF provides the guidance for the determination of subdivisions in CDSM by connecting the image space and object space, and the CDSM with a denser sampling strategy makes the ITF described more detailed. The ITF and CDSM work together to extract the jitter offsets during the imaging process and push the discretization operation result to approximate the continues push-broom output of satellites, hence, the calculation error within the transformation procedure from image space to object space would be reduced.

Step 4: Apply the accurate ITF to the obtained parallax image and conduct the jitter curve fitting to achieve the jitter detection. The accurate ITF illustrates the relationship between the parallax image J(i) and the parameters of the jitter curve, i.e. the amplitude A, the period of the jitter curve $T_j$, and the initial phase θ. The ITF expressed by Eq. (10) is employed on the parallax image obtained in the step 1, and the parameters of the jitter curve are fitted according to the least square, so as to achieve the jitter detection results.

Step 5: Estimate the correspondent partial PSF, combining the spectral and temporal dimensions, according to the CDSM and the obtained jitter curve.

Due to the jitter temporal variation, the PSF tends to vary from one row to the other. The PSF needed for image restoration would be derived from the analysis of a line spread function (LSF). For TDI CCD images, the LSF for row i (LSF(i)) during the single integration time (T) is the normalized energy distribution:

$$LSF(i) = \frac{1}{T}\int_{t_0}^{t_0+T}\delta(i-\varepsilon(t))dt; \quad (11)$$

where $t_0$ is the initial moment of the imaging process, δ(·) is the impulse function, and ε(t) is the jitter offset corresponding to the along-track direction (X(t)) and across-track direction (Y(t)). The PSF of row i (PSF(i)) can be calculated as the multiple integral of LSF(i):

$$PSF(i) = \frac{1}{NT}\sum_{k=1}^{N}\int_{(i-N+k-1)T}^{(i-N+k)T}\delta(i-X(t), i-Y(t))dt; \quad (12)$$

where N represents the number of integration stages of the TDI CCD. Taking the discrete operation for the TDI CCD exposure time via the CDSM, Eq. (12) can be expressed as:

$$PSF(i) = \frac{1}{mN}\left[\frac{1}{2}\delta\left(i-X((i-N)T), i-Y((i-N)T)\right)+\frac{1}{2}\delta(i-X(iT), i-Y(iT))+\sum_{j=1}^{mN-1}\delta\left(i-X\left(\left(i-N+\frac{j}{m}\right)T\right), i-Y\left(\left(i-N+\frac{j}{m}\right)T\right)\right)\right]; \quad (13)$$

where m is the number of subdivisions in the CDSM. The PSF is space-variant due to the jitter temporal variation, thus, that of each row has to be calculated separately. Based on the Eq. (13), the concrete estimation of the PSF is conducted through size determination followed by assignment calculation with superimposed statistics.

The PSF size varies for different image rows and is determined by the maximum value reached by the jitter curve during the imaging period of that specific row. For example, in the generation process of a row, a indicates the maximum value of the jitter offset in the along-track direction, while b indicates that in the across-track direction. r and c represent the number of rows and columns, respectively, ⌈·⌉ operation selects the minimum integer greater than or equal to the value inside. The size of the PSF for the row is defined as:

$$\binom{r}{c} = 2\binom{\lceil|a|\rceil}{\lceil|b|\rceil}+1. \quad (14)$$

The initialization is performed on the empty matrix PSF after size determination. The ideal imaging center is taken as the geometric center of the PSF, while the location of the actual imaging center $((X_{psf}, Y_{psf}))$ at each discrete moment is calculated as follows:

$$\binom{X_{psf}}{Y_{psf}} = \binom{\lceil\frac{r}{2}\rceil+\Delta X}{\lceil\frac{c}{2}\rceil+\Delta Y}. \quad (15)$$

The resampling is performed to obtain the weights of the related points in the PSF when ($X_{psf}$, $Y_{psf}$) corresponds to non-integer values. And the calculation is performed at all discrete moments comprised in the CDSM, covering the whole single-row imaging period. Therefore, for any point of the PSF, multiple weights are calculated at different times; the sum of all calculated weights is assigned to the point.

Step 6: Carry out an adaptive restoration based on context using the partial PSF through optimal window Wiener filtering, by means of multiple input and single output to completes the image restoration.

The adaptive restoration based on context is conducted in a multi-input single-output mode: the row to be restored and its neighboring rows are grouped in an image block as the input; then, the middle row of this restored block is taken as the output. That is, the image is restored line by line, but in a way by processing the image block. For row i, the size of its corresponding image block to be restored depends on its PSF size. If the PSF size is indicated as r*c, the image block to be restored is chosen at least in the rows comprised between [i−r,i+r]. The PSF corresponding to row i is utilized on that image block, using Wiener filtering algorithm, which is able to suppress noise and deal with details. If $\hat{F}(u,v)$ represents the estimated undegraded image, H(u,v) is the degradation function in frequency domain, K is the signal-to-noise ratio and G(u,v) represents the degraded image, the Wiener filtering algorithm can be expressed as follows:

$$\hat{F}(u,v) = \left[\frac{1}{H(u,v)}\frac{|H(uv)|^2}{|H(uv)|^2+K}\right]G(u,v). \quad (16)$$

In order to suppress the ringing effect at the edges of the image while maintain the advantages of Wiener filtering algorithm, a window function is applied to the image before its restoration. The window function is divided into 9 regions, the calculation of which is based on the amount of motion experienced by each segment. Denoted by w(x,y), the window function for the image block, corresponding to the row to be restored, can be represented as follows:

$$w(x,y) = \begin{bmatrix} \sum_{m=0}^{x}\sum_{n=0}^{y}h(m,n) & \sum_{m=0}^{x}\sum_{n=0}^{c-1}h(m,n) & \sum_{m=0}^{x}\sum_{n=y+c-H}^{c-1}h(m,n) \\ \sum_{m=0}^{r-1}\sum_{n=0}^{y}h(m,n) & 1 & \sum_{m=0}^{r-1}\sum_{n=y+c-H}^{c-1}h(m,n) \\ \sum_{m=x+r-V}^{r-1}\sum_{n=0}^{y}h(m,n) & \sum_{m=x+r-V}^{r-1}\sum_{n=0}^{c-1}h(m,n) & \sum_{m=x+r-V}^{r-1}\sum_{n=y+c-H}^{c-1}h(m,n) \end{bmatrix}; \quad (17)$$

where h(m,n) is the representation of the degradation function in spatial domain (i.e. the PSF of the image row to be restored); V and H are respectively the size of the window function, and they are equal to the size of the image block which needs to restore; r and c are respectively the rounding maximum value of the jitter offsets in both directions. Besides, the size of the 4 regions in the corner of the window function are all (r−1,c−1) where (r,c) is equal to the PSF size. If the degraded image block is g(x,y), the windowed degraded image block can be indicated as $g^1(x,y)=g(x,y)w(x,y)$ Since the value of the window function (w(x,y)) is equal to 1 within the central region but gradually approaches 0 towards the image edges, the central area of the windowed image block ($g^1(x,y)$) is equal to that without the window function (g(x,y)), while the value of the edge area gradually tends to 0. In this way, the optimal window Wiener filtering can reduce the gradient jump towards the edge of the image and suppress the ringing effect. It is worth noting that the PSF is space-variant due to the jitter temporal variation, while the window function and degradation function is calculated based on the variable PSF that matches the row to be restored, therefore, the restoration is adaptive.

EXAMPLE

For better explaining the patent, a number of multispectral images of GaoFen-1 02 satellite is used to present the workflow. GaoFen-1 02 satellite is equipped with 8-m optical cameras, capable of recording images in four spectral bands: blue (B1), green (B2), red (B3), and infrared (B4). The B1, B2, and B3 bands are adopted and more detailed information about the used images are listed in Table 1.

TABLE 1

Corresponding table of the detailed image information

| Location | Resolution (m) | Size (px) | Bands used | TDI CCD Integration stages | Single integration time (ms) |
|---|---|---|---|---|---|
| 120.1°E 36.9°N | 8 | 5064 × 1536 | B1 B2 B3 | 24 16 8 | 1.125673453013 |

A computing device comprising an image storage and processing cluster (a cluster requires at least 4 servers, each serving as three nodes in the cluster, server configuration requirements (minimum): memory: 8G, processor: Intel Core i7-7700 @ 3.6 GHz, Hard disk: WDC WD 10EZEX-08WN4A0 1 TB 7200 rpm). When it is executed by the processor, the processor is performed acts comprising: reading the received remote sensing image into the memory, conducting jitter detection and image restoration according to the method of the disclosure, and then outputting restored images with reduced distortion and blur into the memory.

Figure 5A:
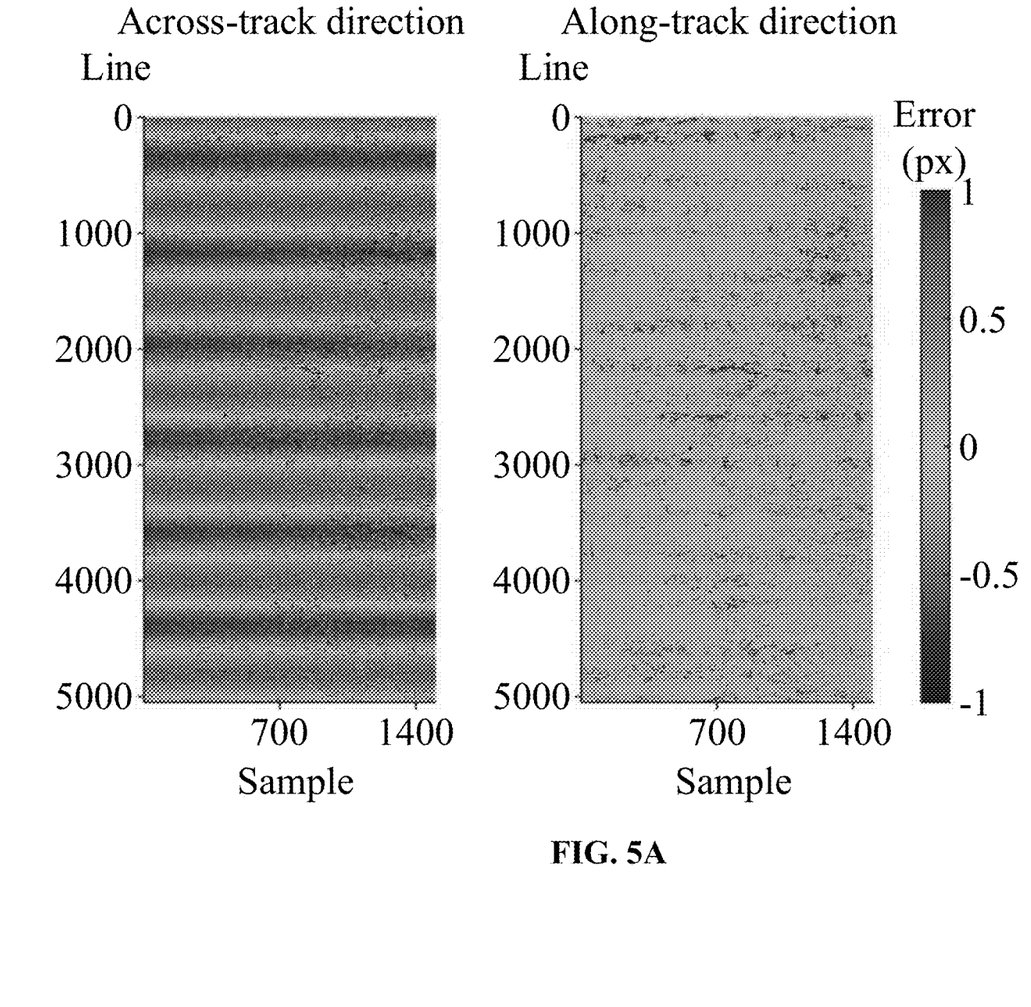
FIGS. 5A-5B show the obtained parallax images after sub-pixel matching, using B1-B2 and B2-B3 bands respectively.
Figure 5B:
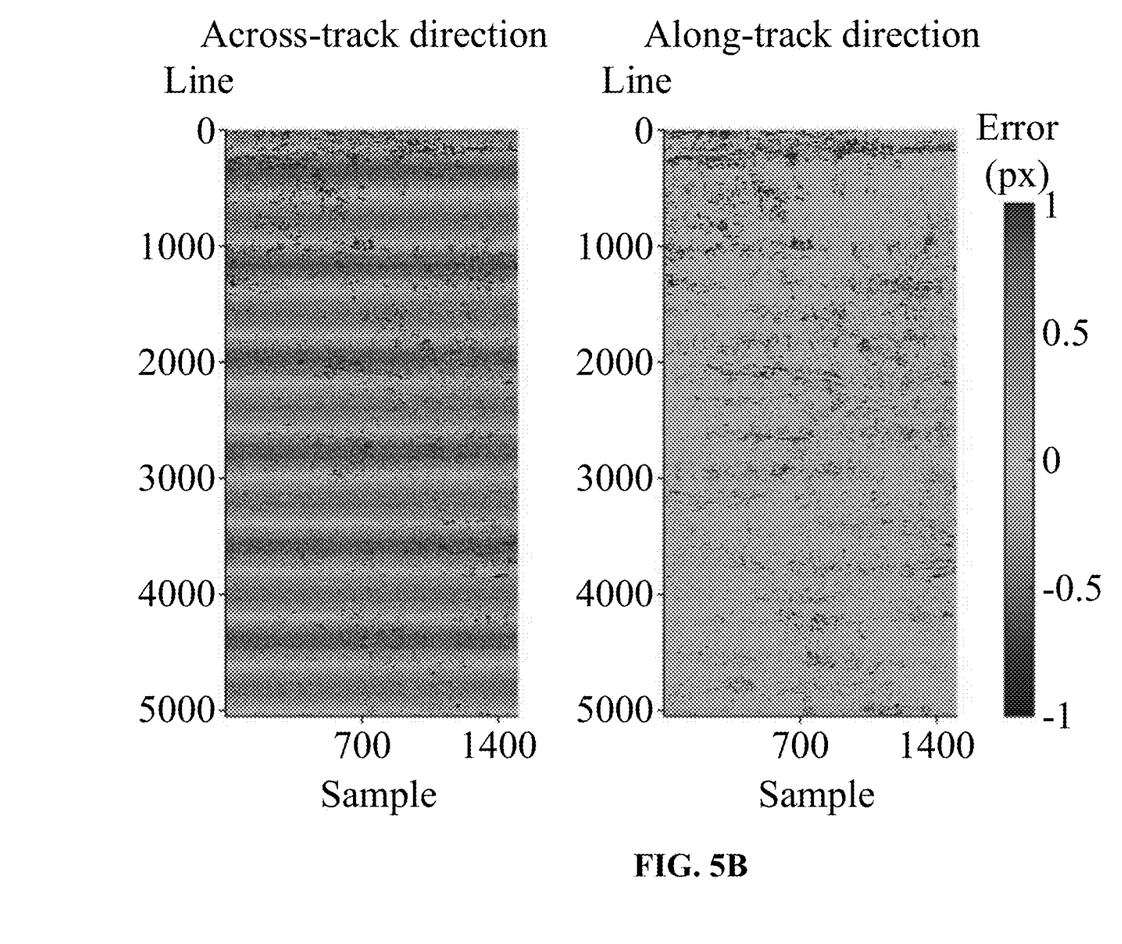

After sub-pixel matching, the obtained parallax images are shown in FIGS. 5A-5B with B1-B2 and B2-B3 bands used respectively.

Based on the ITF and CDSM, the jitter offset is transferred from image space to object space, and the jitter curve is obtained from the parallax image. Table 2 shows the fitted parameters of the jitter curve (i.e., frequency, amplitude, and phase). The deviation between the jitter curve parameters respectively estimated from the B1-B2 and B2-B3 bands is very small. The deviation in frequency is 0.0001 Hz, that in amplitude is 0.0096 pixels and that in phase is 0.0026 rad. It indicates that the presented method has reliability of jitter detection.

TABLE 2

Parameters of the jitter curve

| Bands used | Frequency (Hz) | Amplitude (px) | Phase (rad) |
|---|---|---|---|
| B1 and B2 | 1.1005 | 1.1156 | −3.1254 |
| B2 and B3 | 1.1006 | 1.1252 | −3.1228 |
| deviation | 0.0001 | 0.0096 | 0.0026 |

Figure 6A:
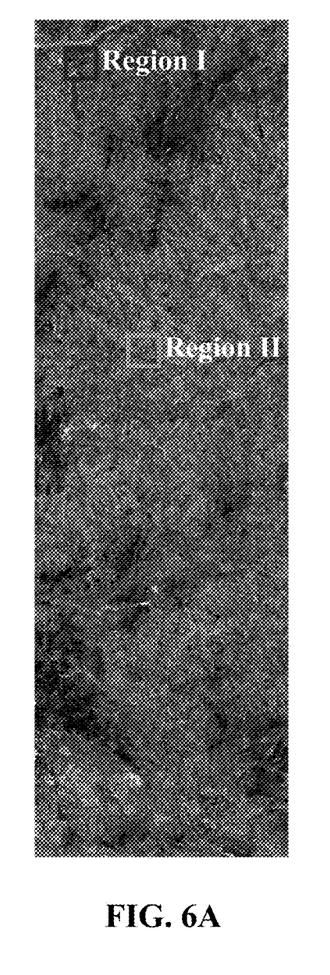
FIGS. 6A-6E show the result by using the method of jitter detection and image restoration for high-resolution TDI CCD satellite images based on continue dynamic shooting model.
Figure 6B:
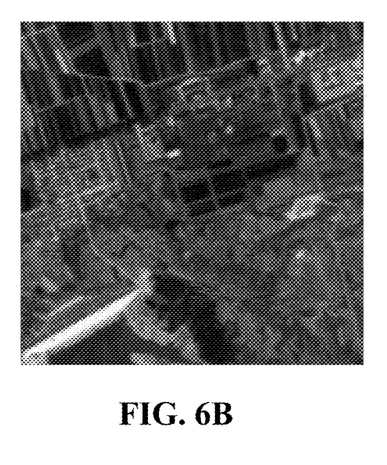
Figure 6C:
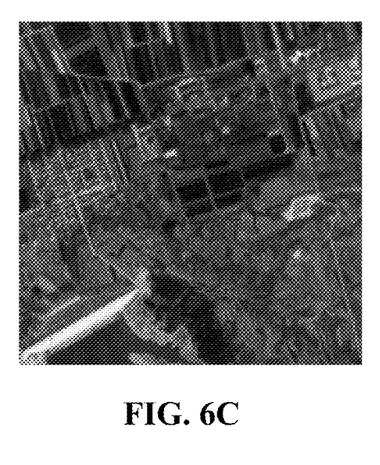
Figure 6D:
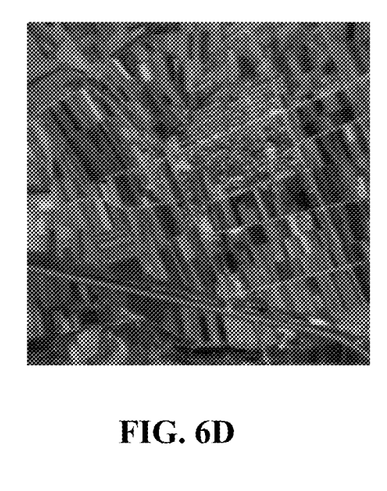
Figure 6E:
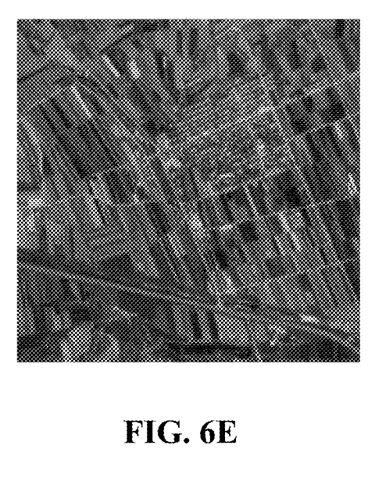

According to the obtained jitter curve, the result after image restoration is shown in FIGS. 6A-6E. The original image is shown in FIG. 6A, the details of region I in FIG. 6A are shown in FIG. 6B, and the obtained results of region I are displayed in FIG. 6C. The details of region II in FIG. 6A are shown in FIG. 6D, and the obtained results of region II are displayed in FIG. 6E. It is obvious that, a visible blur exists in original images, while the clarity of result images is significantly improved.

In addition to the visualized result, details of image quality evaluation before and after restoration were shown in Table 3. In the geometric performance, mean absolute error (MAE) and root mean squared error (RMSE) were adopted as the evaluation indexes. The MAE and RMSE of the restored image are smaller than those of the original image, indicating that the restored image has better geometric quality with less distortion. In the radiometric performance, contrast, average gradient, correlation and Roberts gradient, which were calculated based on the pixels of the whole image, are adopted as the evaluation indexes. According to Table 3, all the radiometric evaluations show that the radiometric quality of the image is improved significantly.

TABLE 3

Image quality evaluation before and after restoration

| | Geometric evaluation | | | Radiometric evaluation | | |
|---|---|---|---|---|---|---|
| | MAE (px) | RMSE (px) | Contrast | Average gradient | Correlation | Roberts gradient |
| Original image | 0.7229 | 0.8229 | 14704.9812 | 128.8486 | 0.8928 | 161.9966 |
| Restored image | 0.2151 | 0.2678 | 21232.1616 | 147.6397 | 0.8416 | 179.5811 |

In summary, the presented method has better performance in both geometric and radiometric aspects. The reason lies in the fact that the presented method treats distortion and blur as coupled effect, and simultaneously deals with the geometric and radiometric problem of images. Besides, the proposed method in this paper is mainly depend on the presented ITF and CDSM. ITF decomposes the overall effect in immediate effects and extracts the immediate jitter offsets in the object space. CDSM provides a denser sampling strategy to take fully into account the jitter temporal variation. Then the continue push-broom mode of TDI CCD can be reflected more accurately. In addition, the estimated PSF is also time-varying and space-varying. So, the distortion and blur in high-resolution TDI CCD images affected by satellite jitter can be compensated simultaneously in restoration. Since temporal variation, spatial distribution and spectrum characteristics are coupled together, the presented method can obtain better geometric and radiometric performance.

It will be obvious to those skilled in the art that changes and modifications may be made, and therefore, the aim in the appended claims is to cover all such changes and modifications.

What is claimed is:

1. A method, comprising:
   obtaining a parallax image after a sub-pixel matching method relying on a correlation coefficient and least squares algorithm;
   transferring a jitter offset from an image space to an object space by an integral transformation function (ITF), which establishes a relationship between the parallax image and a jitter curve;
   dealing with a continuous push-broom mode of cameras in a discrete way with a denser sampling strategy according to a continue dynamic shooting model (CDSM), obtaining a specialized CDSM after determining a number of subdivisions in the CDSM through a sampling error formula established according to the ITF, and feeding the specialized CDSM back to the ITF, so that an accurate ITF is obtained;
   applying the accurate ITF to the obtained parallax image and conducting the jitter curve fitting to achieve the jitter detection;
   estimating a correspondent partial Point Spread Function (PSF), combining spectral and temporal dimensions, according to the CDSM and the obtained jitter curve; and
   carrying out an adaptive restoration based on context using the partial PSF through optimal window Wiener filtering, by means of multiple input and single output to completes the image restoration.

2. The method of claim 1, wherein transferring a jitter offset from an image space to an object space by an integral transformation function (ITF) comprises: establishing the expression of satellite jitter in the image space, establishing the relationship between parallax image and the expression of satellite jitter in the image space, and defining the ITF.

3. The method of claim 2, wherein the ITF achieves the conversion of the jitter from the image space to the object space, as well as the decomposition of the overall effect in immediate effects by converting the parallax images into jitter curves.

4. The method of claim 1, wherein the denser sampling strategy based on subdivision is provided by the CDSM and the discrete issue is approximated to the continuous issue for reflecting the continue push-broom mode of TDI CCD.

5. The method of claim 4, wherein a number of subdivisions in the CDSM is determined as follows: the sampling error formula is established according to the ITF to explore the relationship between the number of subdivisions in the CDSM and the corresponding error; the sampling error formula shows that more subdivisions in the CDSM correspond to smaller errors; the errors tend to remain stable despite continuous increases in the subdivisions; the errors remain relatively stable when subdivisions in the CDSM are more than 6, therefore, 6 is taken as a reasonable number of subdivisions.

6. The method of claim 1, wherein the ITF and the CDSM work together; the ITF provides the guidance for the determination of subdivisions in CDSM by connecting the image space and the object space, and the CDSM with the denser sampling strategy makes the ITF described more detailed.

7. The method of claim 1, wherein the PSF needed for image restoration is derived from the analysis of a line spread function (LSF), and the concrete estimation of the PSF is conducted through two main steps: size determination and assignment calculation with superimposed statistics.

8. The method of claim 7, wherein the PSF combines the spectral and temporal dimensions.

9. The method of claim 7, wherein the PSF is space-variant and tends to vary from one row to the other due to the jitter temporal variation.

10. The method of claim 1, wherein the adaptive restoration based on context takes into account the spatial information: the uniqueness of each row, and the similarities between neighboring rows; the adaptive restoration based on context is conducted in a multi-input single-output mode: the row to be restored and its neighboring rows are grouped in an image block as the input of restoration; then, the middle row of this restored block is taken as the output of restoration; the image restoration is conducted line by line, but in a way by processing the image block.

11. A computing device executing the method of claim 1, the device comprising:
image storage and processing cluster that comprises instructions that, when executed by the processor, cause the processor to perform acts comprising: reading the received remote sensing image into the memory, conducting jitter detection and image restoration, and then outputting restored images with reduced distortion and blur into the memory, where the jitter detection and image restoration includes:
obtaining a parallax image after a sub-pixel matching method relying on a correlation coefficient and least squares algorithm;
transferring a jitter offset from an image space to an object space by an integral transformation function (ITF), which establishes a relationship between the parallax image and a jitter curve;
dealing with a continuous push-broom mode of cameras in a discrete way with a denser sampling strategy according to a continue dynamic shooting model (CDSM), obtaining a specialized CDSM after determining a number of subdivisions in the CDSM through a sampling error formula established according to the ITF, and feeding the specialized CDSM back to the ITF, so that an accurate ITF is obtained;
applying the accurate ITF to the obtained parallax image and conducting the jitter curve fitting to achieve the jitter detection;
estimating a correspondent partial PSF, combining spectral and temporal dimensions, according to the CDSM and the obtained jitter curve; and
carrying out an adaptive restoration based on context using the partial PSF through optimal window Wiener filtering, by means of multiple input and single output to completes the image restoration.

* * * * *